Patented June 16, 1925.

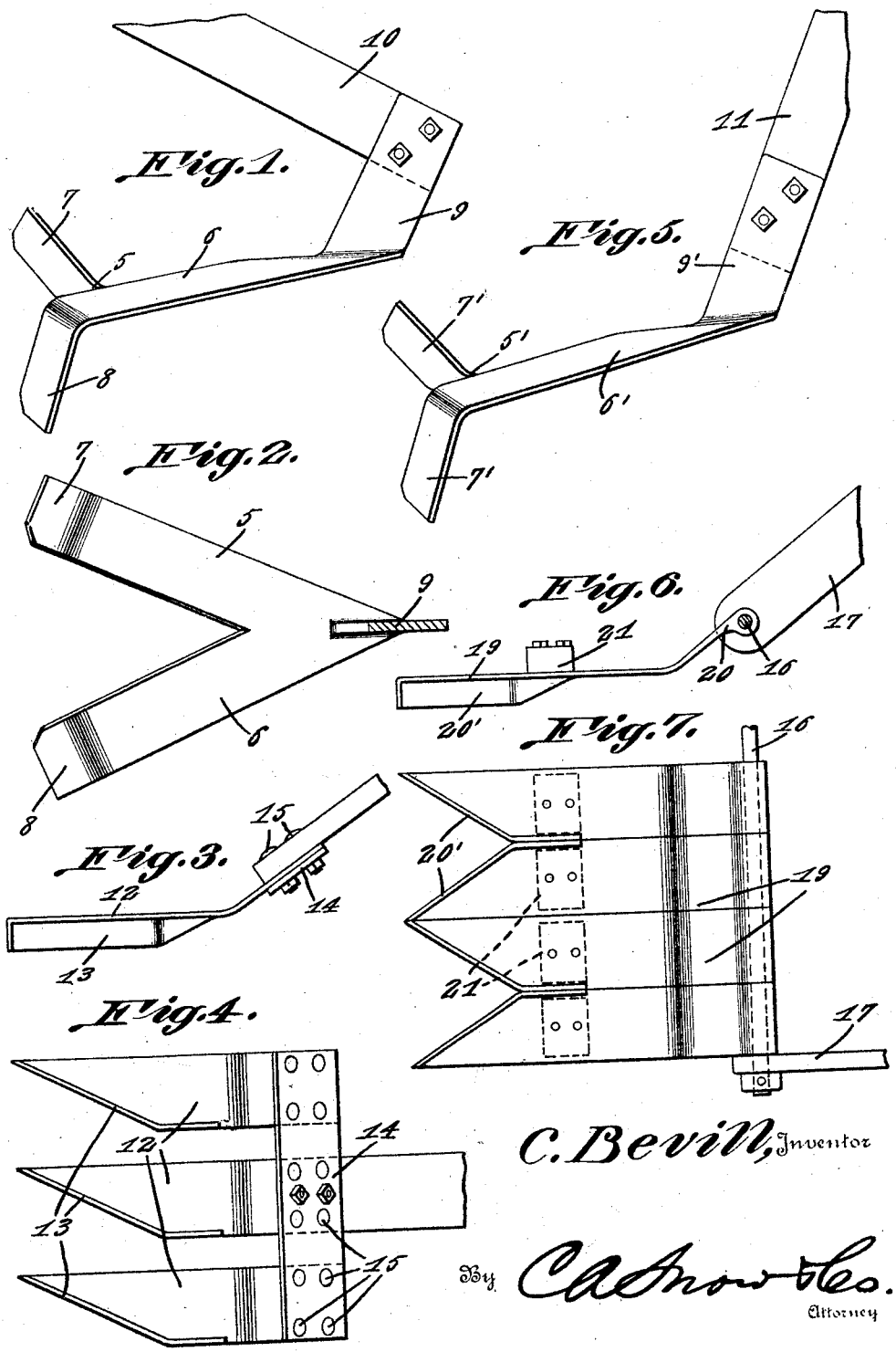

1,541,894

UNITED STATES PATENT OFFICE.

CLAIBOURN BEVILL, OF BUSHNELL, FLORIDA.

CULTIVATOR BLADE.

Application filed October 27, 1922. Serial No. 597,359.

*To all whom it may concern:*

Be it known that I, CLAIBOURN BEVILL, a citizen of the United States, residing at Bushnell, in the county of Sumter and State of Florida, have invented a new and useful Cultivator Blade, of which the following is a specification.

This invention relates to cultivators and aims to provide a novel form of hand cultivator which will operate to efficiently break up the soil to facilitate the planting thereof.

Another object of the invention is to provide a cultivator including pivoted blade sections the blades having downwardly extending flanges, to contact with the ground surface for accomplishing the cultivating result.

A still further object of the invention is to provide a cultivator wherein the blades taper towards the free ends thereof to cause the ground under cultivation to be thrown towards the center of the cultivator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a hand cultivator.

Figure 2 is a plan view thereof.

Figure 3 is an elevational view of a modified form of hand cultivator.

Figure 4 is an elevational view thereof.

Figure 5 is a side elevational view of a hand cultivator adapted to be pulled by the operator.

Figure 6 is a side elevational view of a modified form of cultivator embodying the principals of the invention in a power-driven cultivator.

Figure 7 is a plan view thereof.

Referring to the drawings in detail, the device includes angularly disposed blades 5 and 6 respectively, the blade 5 being shown as having an upwardly extended end portion 7, while the blade 6 is formed with a downwardly extended portion 8. The downwardly extended portion 8 and the upwardly extended portion 7 of the blades operate to contact with the earth to loosen the same and break up the lumps.

Formed integral with the blades 5 and 6 are the upwardly and outwardly extended spaced arms 9 to which is bolted the bar 10, by means of which the cultivator may be forced through the ground surface.

As shown by Figure 5 of the drawing, the cultivator blades 5' and 6' are formed with angularly disposed sections 7'. The handle portion which is indicated at 11, is bolted to the arm 9' of the cultivator blades and extends outwardly providing a cultivator which may be drawn through the ground surface.

In the form of the invention as illustrated by Figures 3 and 4 of the drawing, each of the blades 12 is formed with a downwardly extended flange 13 formed along the inclined edge thereof, which flange contacts with the loose earth to force the same laterally when the cultivator is moved through the soil.

As shown, these blades 12 are arranged in spaced relation and held in such spaced relation by means of the bar 14, which has connection with the blades as by means of the bolts 15.

The structure as illustrated by Figures 6 and 7 of the drawing, is especially adapted for use as a power-driven cultivator, wherein the supporting rod 16 may be mounted on a frame in any suitable manner, one of the side bars of the frame being indicated at 17. The blades which are indicated at 19, have upwardly extended portions 20 formed with openings to accommodate the rod 16.

These blades 19 are formed with tapered surfaces, the flanges 20', which are formed integral with the tapered surfaces, extend downwardly and contact with the loose soil to move the same laterally. Weights 21 are bolted or otherwise secured to the blades 19 and operate to force the blades 19 into the soil to insure the efficient operation of the device as a cultivator.

Having thus described the invention, what is claimed as new is:—

A cultivator including a plurality of blades, each of the bdaes having a diagonally disposed rear end, and flanges extending at right angles to the blades and formed along one edge thereof and along the diagonally disposed rear end.

In testimony that I claim the foregoing as my own, I have hereto affixed my signature in the presence of two witnesses.

CLAIBOURN BEVILL.

Witnesses:
 LONIE AKINS,
 ANNA L. BEVILL.